United States Patent [19]

Oishi et al.

[11] Patent Number: 4,689,705
[45] Date of Patent: Aug. 25, 1987

[54] COUNTER DEVICE FOR A MAGNETIC RECORDING DISK CARTRIDGE

[75] Inventors: Kengo Oishi, Ebina; Tuyoshi Ono, Minami-ashigara, both of Japan

[73] Assignee: Fuji Photo Film Co., Ltd., Japan

[21] Appl. No.: 855,521

[22] Filed: Apr. 16, 1986

Related U.S. Application Data

[63] Continuation-in-part of Ser. No. 516,349, Jul. 22, 1983, abandoned.

[30] Foreign Application Priority Data

Aug. 2, 1982 [JP] Japan ................................. 57-134944

[51] Int. Cl.[4] .............................................. G11B 23/03
[52] U.S. Cl. .................................... 360/133; 206/444
[58] Field of Search ................... 360/132, 133, 97, 98, 360/99; 206/444, 445; 354/275

[56] References Cited

U.S. PATENT DOCUMENTS 3,995,319 11/1976 Harris ............................ 360/132 X
4,466,032 8/1984 Saito ...................................... 360/99
4,511,944 4/1985 Saito ................................. 360/97 X Primary Examiner—Robert S. Tupper
Assistant Examiner—Andrew L. Sniezek
Attorney, Agent, or Firm—Gerald J. Ferguson, Jr.; Michael P. Hoffman; Ronni S. Malamud

[57] ABSTRACT

Disclosed is a magnetic recording disk cartridge comprising a slide indicator movable step by step along one side wall of the casing to indicate the number of pictures already recorded in an associated magnetic recording medium, a ratchet member for preventing the slide indicator from moving backward, and a reset member for releasing the slide indicator from the ratchet member and permitting the return of the slide indicator to the start position. The combined action of these elements permits: first, the indication of the exact number of pictures recorded in the magnetic recording medium when the cartridge is removed from the camera body, with no danger of an erroneous indication of a lesser number than the number of the recorded pictures; and second, the return of the slide indicator to the start position if it is desired that the magnetic recording medium be erased and reused from the beginning.

4 Claims, 6 Drawing Figures

COUNTER DEVICE FOR A MAGNETIC RECORDING DISK CARTRIDGE

This application is a continuation-in-part of application Ser. No. 516,349, filed July 22, 1983 now abandoned.

BACKGROUND OF THE INVENTION

1. Field of the Invention

This invention relates to a magnetic recording disk cartridge, and more particularly to a magnetic recording disk cartridge containing a very thin magnetic recording disk of small diameter which is adapted to rotate at a high speed during recording and playback of video signals.

2. Description of the Prior Art

As is well known, a magnetic recording disk or floppy disk is composed of a flexible polyester sheet disk having both surfaces coated with a magnetic substance for recording digital information with the aid of a magnetic recording head, and the floppy disk has been widely used as a recording medium for computers because it is easy to handle and inexpensive to produce.

Recently, use of the floppy disk has extended to a still camera, in which the floppy disk is used in place of silver-halide coated film, taking advantage of the reusability of the magnetic recording medium in addition to those advantages as mentioned above. The floppy disk appropriate for use in a still camera must be small in size, that is, small in diameter and at the same time thin in thickness. Then, a casing for accommodating such a small-sized floppy disk can be reduced in size accordingly, and it has been proposed that a small-sized magnetic recording disk cartridge be made of a hard material and designed to allow the magnetic recording disk to rotate at a high speed. Such a small hard cartridge (hereinafter referred to as "cartridge") has made it possible to develop a 35 mm still camera using a magnetic recording medium in place of a roll of film.

Different from the conventional silver halide coated photographic film for exposure to light in taking pictures, a magnetic recording medium can be removed from the camera body before the whole recording area of the magnetic recording medium has been used, and then the unfinished recording medium can be put in the camera body again to use the remaining space for additional pictures. In this connection, a plurality of magnetic recording disks can be classified by subject, and then these magnetic recording disks can be selectively used for additional recording in the remaining blank space, thus permitting compilation of pictures by subject.

In this case, when the user removes a disk from the camera body, it is necessary for him to be able to know the number of pictures already taken and the number that can be additionally taken.

SUMMARY OF THE INVENTION

The object of this invention is to provide a cartridge equipped with means for indicating the number of pictures already recorded in a magnetic recording medium.

To attain this object a cartridge according to this invention comprises: a casing; a slide indicator movable step by step along one side of the casing in one direction each time a picture has been taken on a magnetic recording disk housed within the casing; a ratchet member for preventing the slide indicator from moving backward in the other direction; and reset means for releasing the slide indicator from the ratchet member, thereby permitting the slide indicator to return to the start position.

The slide indicator may have a catch projection, and the ratchet member may comprise an elongated plate having sawtooth-indentations along one longitudinal side thereof and means for resiliently putting itself in engagement with the catch projection of the slide indicator. In the cartridge of this invention there are provided, in combination, the slide indicator movable along one side of the casing for indicating the number of pictures already recorded in the magnetic disk, the ratchet member for preventing the slide indicator from moving backward and the reset means for releasing the slide indicator from the ratchet member and permitting the slide indicator to return to the start position. Thanks to the cooperative action of these elements the number of pictures already recorded in the magnetic disk can be read from the indication on the cartridge when the cartridge is removed from the camera body prior to using the whole recording space of the magnetic disk. As the number thus indicated by the slide indicator is never smaller than the number of pictures actually taken, there is no danger of an erroneous indication which might lead to erasing of pictures already taken. Also, if it is desired that the magnetic recording medium be erased and reused, the slide indicator can be reset to the start position.

The recording and reproducing apparatuses with which the cartridge is used by be equipped with a detector for detecting the position of the slide indicator, and the recording and reproducing apparatuses may be so constructed that recording is begun from the area immediately following the last area already recorded as indicated by the indicator and that playback starts from the beginning and ends at the final recording area as indicated by the indicator. Then, in recording there will be no danger of erroneous erasing of recorded pictures, and in reproducing there will be no playback of unrecorded areas of the magnetic recording disk.

DESCRIPTION OF THE PREFERRED EMBODIMENT

Other objects and advantages of this invention will be understood from the following description of a sole preferred embodiment, which is shown in the accompanying drawings.

Figure 3:
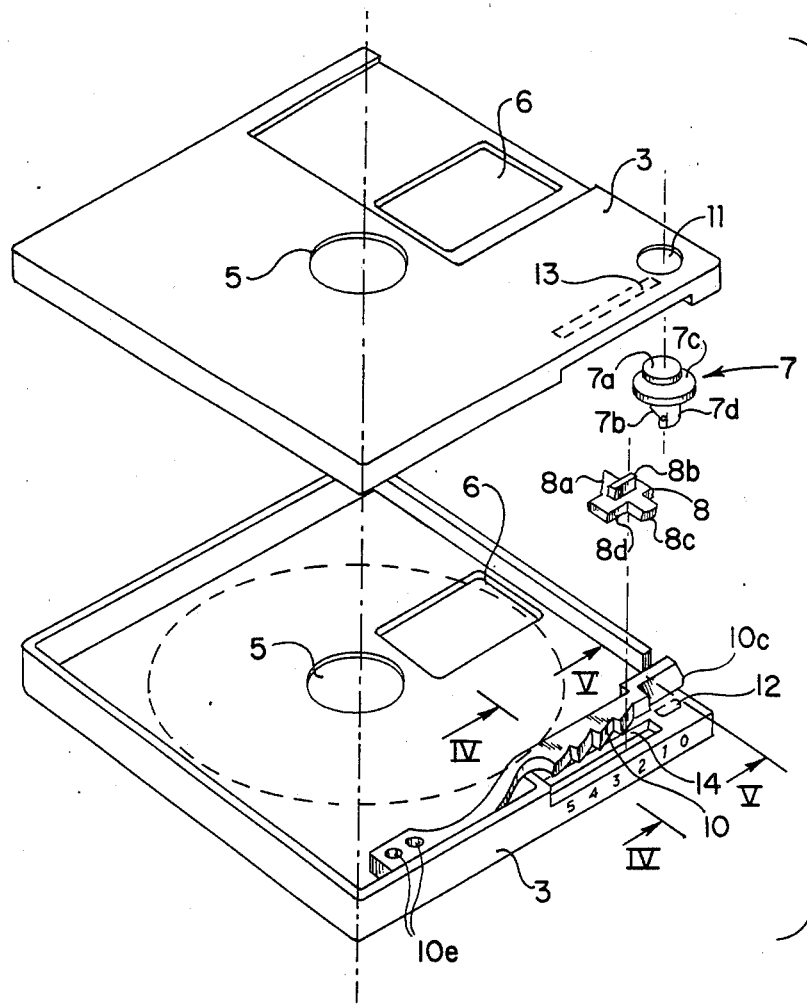
FIG. 3 is an exploded perspective view of the cartridge according to the preferred embodiment of the present invention.
Figure 4:
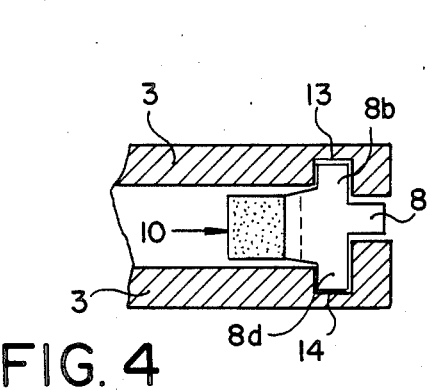
Figure 5A:
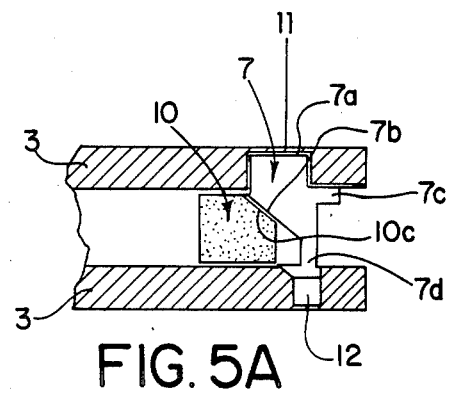
Figure 5B:
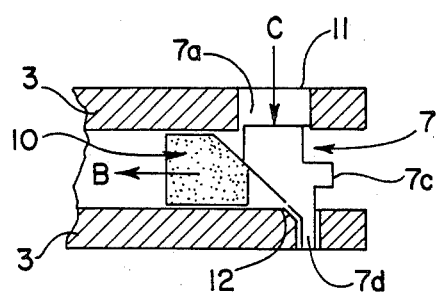

FIG. 4 is a fragmented, cross sectional view, taken along line IV of FIG. 3, of the slide indicator and its placement relative to the ratchet member, and the relation of both of these elements to the casing; and FIGS. 5A and 5B are fragmented, cross sectional views, taken along line V of FIG. 3, of the reset button, wherein FIG. 5A shows the reset button in a nondepressed position, and FIG. 5B shows the reset button pressed in the direction "C", so as to cause displacement of the ratchet member in the direction "B".

Referring to the Figures, a cartridge 1 is composed of a magnetic recording disk 2, which consists of a thin flexible magnetic recording medium 2a and a hub 2b fixed to the center of the magnetic recording medium 2a, and a generally square casing 3 for accommodating the magnetic recording disk 2. The magnetic recording medium 2a is composed of a very thin polyester sheet having a thickness of, for instance, 50 μ or less with a magnetic coating formed thereon by, for instance, applying, vapor-depositing or sputtering a magnetic material appropriate for the purpose. The magnetic recording disk is adapted to rotate at a high speed in recording video signals thereon. The ceiling plate 3a of the casing 3 is provided at the center thereof with a hub hole 5 through which the hub 2b of the magnetic recording disk is exposed, and with a generally rectangular hole 6 for permitting a recording or reproducing magnetic head to access and move radially on the magnetic recording medium. A long slit 9 is made on one side 3b of the casing 3, extending from the corner to the midpoint of the side 3b of the casing 3. A slide indicator 8 is provided in the elongated slit 9. The slide indicator 8 is made to move along the slit 9 step by step each time a picture has been recorded in the magnetic recording disk. A number corresponding to the number of the pictures already recorded in the magnetic recording medium 2a is indicated at each stop of the slide indicator, thus giving an indication of the exact number of recorded pictures.

Figure 2:
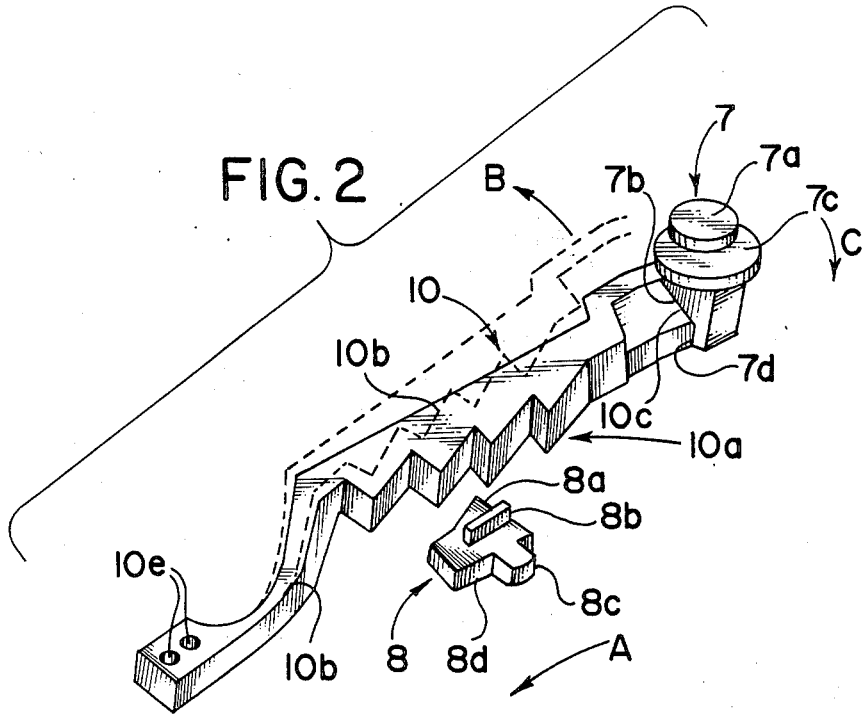
FIG. 2 is a perspective view of a mechanism for indicating the number of pictures already recorded in a magnetic recording disk, the mechanism being provided in the cartridge of FIG. 1.

FIG. 2 shows, in detail, a mechanism for indicating the number of pictures recorded in the magnetic recording medium. As mentioned earlier, this mechanism is composed of a slide indicator 8 slidably fitted in the elongated slit 9 on the side 3b of the casing, a ratchet member 10 for preventing the slide indicator 8 from moving in the direction opposite to that which is indicated by arrow "A", and a reset button 7 for releasing the slide indicator 8 from the ratchet member 10 and permitting the slide indicator 8 to move in the opposite direction. The slide indicator 8 is flat and thick enough to fit snugly in the elongated slit 9. The slide indicator comprises a head projection 8b, a pointer 8c extending from one side of the head projection body 8b to the extent that the pointer 8c may appear above the elongated slit of the casing when the slide indicator is fitted therein, a ramp projection 8a extending from the opposite side of the slide body, and a bottom projection 8d. As shown in FIG. 4, the casing 3 has upper and lower guide grooves 13 and 14 for respectively receiving the head projection 8b and the bottom projection 8d.

Figure 1:
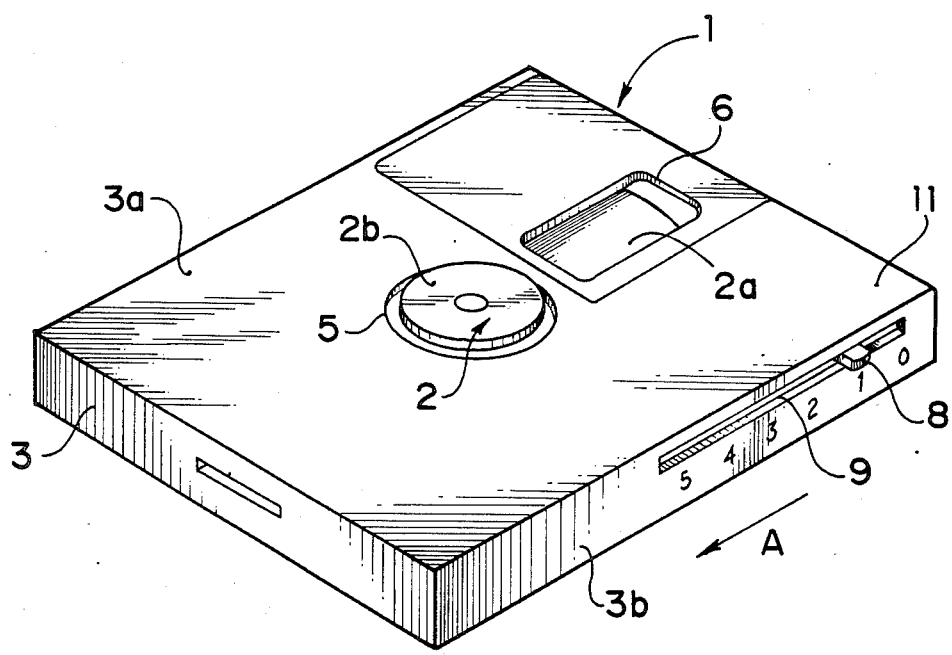
FIG. 1 is a perspective view of a cartridge according to a preferred embodiment of this invention.

The ratchet member 10 consists of an elongated plate having serrations along one longitudinal side 10a thereof for catching the ramp projection 8a of the slide indicator 8 and a curved arm 10b integrally connected to and extending from the serrated plate. The ratchet member 10 is fixed at the free end of the curved arm 10b in the casing so as to resiliently bias the serrated side 10a of the ratchet member towards the elongated slit of the casing, thereby catching the slide indicator 8 to prevent it from moving backward in the direction opposite to that which is indicated by arrow "A". The ratchet member 10 has a tapered portion 10c which normally abuts to the ramp extension 7b of the reset button 7 and is pushed in the direction indicated by the arrow "B" when the head 7a is pressed in the direction indicated by arrow "C". Further, the ratchet member 10 has apertures 10e, 10e into which protrusions (not shown) of casing 3 are inserted to fix the end portions of the curved arm within the casing 3. The reset button 7 is positioned at one corner of the casing 3 (FIG. 1), with its head 7a partly appearing above the ceiling plate 3a of the casing 3, thus permitting push-and-release finger operation. Specifically, it comprises a head 7a, a ramp extension 7b, a flange 7c, and a bottom projection 7d, all integrally connected. The casing 3 has head and bottom apertures 11 and 12 for respectively receiving and guiding the head 7a and bottom projection 7d. Finger pressure on the head portion 7a in the direction indicated by arrow "C" will cause the ramp extension 7b to push the ratchet member 10 with is inclined surface in the direction indicated by arrow "B" to the position shown in phantom lines, thus releasing the slide indicator 8 from an indentation of the ratchet member. The ratchet member 10 may be molded from a plastic material appropriate for the purpose of furnishing its curved arm with sufficient resilience, for instance, polypropylene.

In operation, each time a still picture has been recorded on the magnetic recording medium 2a with a magnetic head, a lever (not shown) drives the slide indicator 8 step by step in the direction as indicated by arrow "A", thus giving an indication of the exact number of pictures recorded in the magnetic recording medium.

Then, the ramp projection 8a of the slide indicator 8 is caught by one of the indentations of the ratchet member 10 and is held in engagement therewith by the resilience of the curved arm 10b of the ratchet member 10. In more detail, the curved arm 10b of the ratchet member 10 generates a resilient force in the ratchet member at all times, thus pushing the serrated side 10a of the ratchet member 10 against the ramp projection 8a of the slide indicator 8. As the slide indicator 8 advances in the direction indicated by arrow "A", the inclined surface of the ramp projection 8a pushes the inclined surfaces of indentations one after another. Each time this happens the ratchet member yieldingly withdraws in the direction as indicated by arrow "B" until the ramp projection 8a climbs over the crest of the sawtooth projection, and then the ratchet member 10 snaps back to the original position in the direction opposite to that which is indicated by arrow "B", thus releasing the stored resilience. When the ratchet member 10 is brought to its original position after each shot, the ramp projection 8a fits in the indentation one step ahead of the previous one, preventing the slide indicator from returning to the previous indentation. The slide indicator 8 is made to advance step by step each time a picture has been recorded in the magnetic recording medium 2a, giving an indication of the exact number pictures recorded in the magnetic recording medium 2a which can be read from the indicated numeral on the slotted side 3b of the casing 3.

In its engaged condition the vertical side of the ramp projection 8a of the slide indicator 8 is held in contact with the vertical edge of the serrated side 10a, and therefore backward displacement of the slide indicator is positively prevented. In this connection, when the cartridge 1 is removed from the camera body, even if its indicator pointer 8c should happen to strike against something so as to apply a backward force on the slide indicator 8c in the direction opposite to that which is indicated by arrow "A", the slide indicator 8c will not move backward to indicate a lesser number than the number of pictures recorded in the magnetic recording medium 2a. When the magnetic medium is to erased and reused from the beginning, the user can return the slide indicator to the start position by depressing the reset button 7 with his finger in the direction as indicated by arrow "C". Then, the inclined surface of the ramp extension 7b of the reset button 7 will push the serrated side 10a of the ratchet member 10 away from the ramp projection of the slide indicator 8 in the direction as indicated by arrow "B" until the ramp projection 8a is released from one of the indentations of the ratchet member, permitting the slide indicator to return to the start position. Here the return to the start position is effected by finger. However, if the slide indicator is urged towards the start position by, for instance, a rubber string, spring or any other resilient biasing means all the time, the return to the start position will be effected automatically simply by depressing the reset button.

In this particular embodiment, a curved arm is used to generate resilience in the ratchet member and permitting the return of the slide indicator member. Alternatively, the ratchet member may be rotatably fixed at one end thereof, and a resilient means may be provided to apply a bias force to the other end of the ratchet member.

As is apparent from the above, the cartridge according to this invention comprises a slide indicator movable step by step along one side wall of the casing to indicate the number of pictures already recorded in an associated magnetic recording medium, a ratchet member for preventing the slide indicator from moving backward, and a reset means for releasing the slide indicator from the ratchet member and permitting the return of the slide indicator to the start position. The combined action of these elements permits: first, the indication of the exact number of the pictures recorded in the magnetic recording medium when the cartridge is removed from the camera body, with no danger of an erroneous indication of a lesser number than the number of the recorded pictures; and second, the return of the slide indicator to the start position if it is desired that the magnetic recording medium by erased and reused from the beginning.

What is claimed is:

1. A magnetic recording disk cartridge comprising a flexible magnetic recording disk which is capable of recording information for the recordation and reproduction of a number of still pictures when rotated at a high speed, and a generally square casing for accommodating the magnetic recording disk, characterized in that it further comprises a slide indicator that linearly moves step by step along one side wall of the casing in one direction every time a still picture is recorded in the magnetic recording medium, a ratchet member for preventing the slide indicator from moving in the opposite direction and a reset means for releasing the slide indicator from the ratchet member and permitting the slide indicator to move in the opposite direction.

2. A magnetic recording disk cartridge according to claim 1 wherein said slide indicator has a ramp projection and said ratchet member is serrated along one longitudinal side thereof and means for resiliently biasing the serrated side of the ratchet member towards the ramp projection of the slide indicator.

3. A magnetic recording disk cartridge according to claim 1 wherein numerals are provided on the side wall of the casing at those positions at which the slide indicator stops, thereby enabling the indication of the exact number of pictures recorded in the magnetic recording disk.

4. A magnetic recording disk cartridge according to claim 2 wherein numerals are provided on the side wall of the casing at those positions at which the slide indicator stops, thereby enabling the indication of the exact number of pictures recorded in the magnetic recording disk.

* * * * *